Oct. 12, 1948.  V. A. HOOVER  2,450,963
COOLING SYSTEM FOR ELECTRIC MOTORS AND HYDRAULIC PUMPS
Filed Nov. 13, 1945
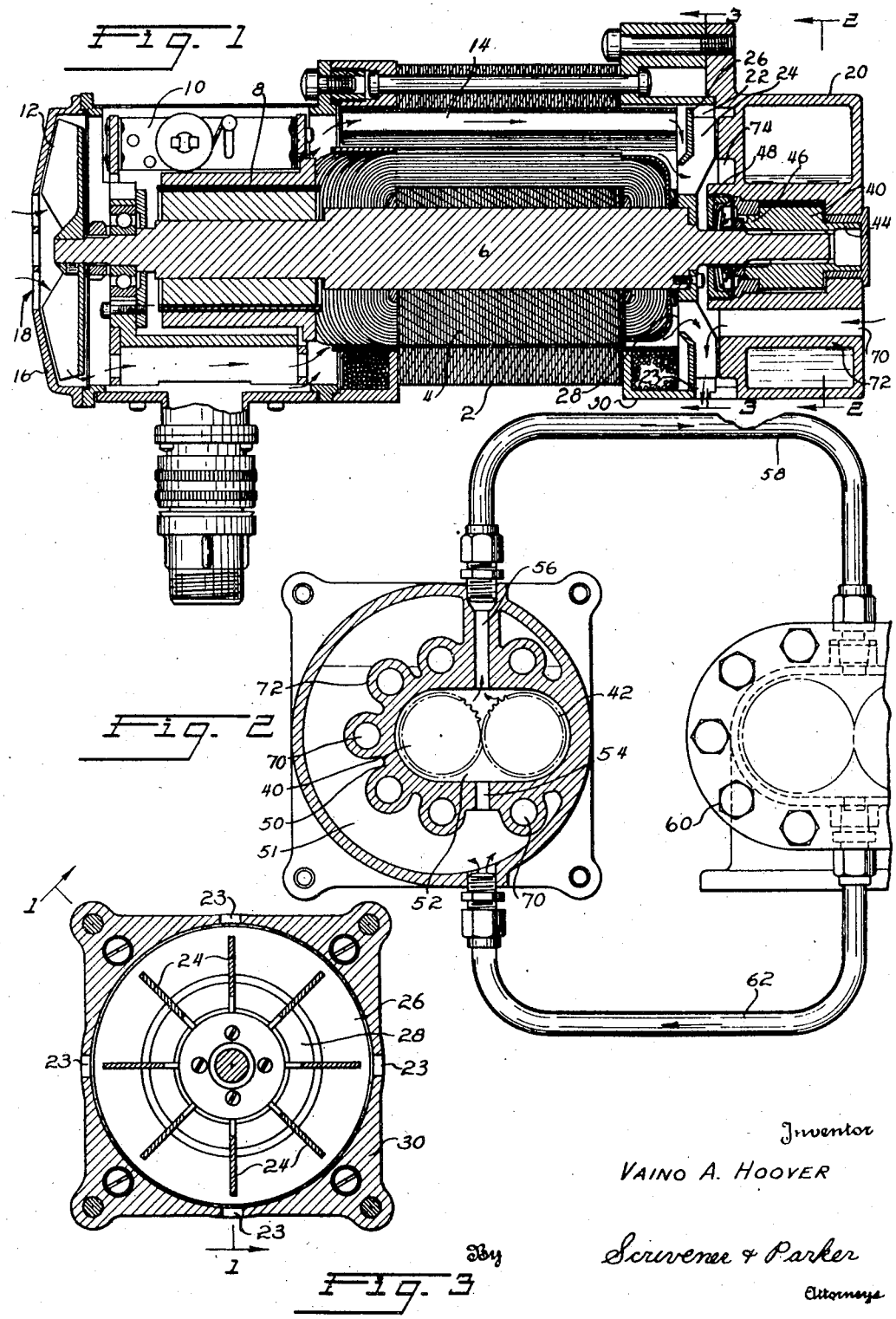
Inventor
VAINO A. HOOVER
By Scrivener & Parker
Attorneys Patented Oct. 12, 1948

2,450,963

UNITED STATES PATENT OFFICE 2,450,963

COOLING SYSTEM FOR ELECTRIC MOTORS AND HYDRAULIC PUMPS

Vaino A. Hoover, Los Angeles, Calif., assignor to Electrical Engineering and Manufacturing Corporation, Los Angeles, Calif., a corporation of California Application November 13, 1945, Serial No. 627,980

1 Claim. (Cl. 103—118)

This application is a continuation in part of my copending application Serial No. 509,295, now abandoned.

This invention relates generally to systems embodying a hydraulic pump which is driven by an electric motor and, in particular, has to do with means for cooling the motor and pump elements of such systems.

The principal object of this invention, which is achieved by the means herein described and claimed, has been to provide an efficient and efficacious means for removing from motor-pump systems of the described type the considerable quantities of heat which are generated within the motor and pump.

A further object of the invention has been to provide a motor-pump apparatus of the type described which will embody common means for cooling the parts of the electric motor, the parts of the hydraulic pump and the oil pumped thereby, and which means will be so operative that neither the cooling medium passed over the motor nor that passed over the pump will come in contact with the other element of the apparatus.

Other objects and features of novelty of the invention will be made apparent by the following description and the annexed drawings which, it will be understood, are merely illustrative of the invention and impose no limitations thereon not imposed by the appended claim.

Referring to the drawings, in which similar reference numerals refer to like parts, Fig. 1 is a longitudinal sectional view of an electric motor and hydraulic pump device embodying cooling means according to this invention, taken on line 1—1 of Fig. 3;

Fig. 2 is a cross-sectional view taken on line 2—2 of Fig. 1 and showing also the hydraulic motor which is operated by the pump of Fig. 1, and Fig. 3 is a cross-sectional view taken on line 3—3 of Fig. 1.

My invention consists broadly in the provision of an apparatus comprising an electric driving motor, a hydraulic pump driven thereby, and means for cooling the motor and pump, such an apparatus being disclosed in the drawings forming part of this application. The electric motor element of the apparatus illustrated in the drawings comprises stator 2, armature 4, armature shaft 6, commutator 8 and brush assembly 10. These parts of the electric motor are preferably, although not necessarily, formed in the manner described and claimed in my Patents Nos. 2,408,854, 2,427,282, and 2,428,162. At the commutator end of the motor a cooling fan 12 is mounted on the end of the armature shaft and is so constructed as to force air in the direction of the other or driving end of the motor, such air passing through the brush assembly, between the brush assembly and commutator, through the air gap between the stator and rotor and through passages 14 which are formed within the stator and extend longitudinally thereof. A plate 16, having openings 18 therein covers the fan 12 and the commutator end of the motor.

At the driving end of the motor there is attached thereto a casing 20 into which the end of armature shaft 6 extends. Between the ends of the rotor and stator parts of the motor and the adjacent wall of chamber 20 is a chamber 22 which communicates to atmosphere through openings 23 in the peripheral wall thereof and within which is disposed a fan 24 which is attached to the armature shaft. The fan 24 has radial blades and on the side thereof adjacent the motor is provided with a shroud 26 having a central opening 28. At its outer periphery the shroud has a running fit with the annular inner wall of the end member 30 of the motor.

Within the casing 20 the armature shaft 6 has attached thereto the driving gear 40 of a gear pump, the second gear 42 of which is also disposed within casing 20. The gear 40 is preferably directly splined to shaft 6 and is provided at its ends with sleeve bearings 44, 46 for rotatably supporting both the gear and the shaft. Sealing means 48 surround the shaft 6 at the motor end of casing 20 in order to prevent leakage of oil from the pump along the shaft into the fan chamber 22.

Within the pump casing 20 and integrally formed therewith is a part 50 which extends axially from wall to wall of the casing but is of less area than the casing, shown in Fig. 2, whereby the space within the casing and surrounding the part 50 provides a reservoir 51 for oil. The part 50 has an internal cavity 52 within which the pump gears 40, 42 are disposed and which is properly shaped in accordance with usual gear pump practice. This cavity 52 communicates with the reservoir 51 through a lower passage 54 and, through an upper passage 56, with a delivery pipe 58 leading to a hydraulic motor 60, the outlet side of which communicates with reservoir 51 through pipe 62.

Also formed internally of the part 50 of the pump casing casting are air passages 70 which, as shown, are preferably isolated from each other by being formed in separate section 72 of part-circular cross-section, by reason of which each part 72 will have maximum contact with the oil in the reservoir 51. Each of the air ducts 70 opens at one end to the surrounding atmosphere at the outer end of the casing 20 and, at its other end opens into an annular space 74 which forms part of fan chamber 22 and which is adjacent the central part of the un-shrouded side of the fan 24.

From a consideration of the described hydraulic system it is obvious that all of the power which is delivered by the electric motor to the hydraulic pump and which is not converted into useful hydraulic energy by the pump is absorbed in heating up the pump structure and the oil being pumped. Likewise, in the case of the hydraulic motor 60 all of the energy which is delivered by the oil line 58 to the hydraulic motor and which is not converted into useful mechanical energy at the hydraulic motor drive shaft is converted into heat, which increases the temperature of the hydraulic motor and the oil discharged from the hydraulic motor to the oil reservoir of the pump casting. Thus, the total losses in both the pump and the hydraulic motor structure appear in heat generation in the pump structure, the hydraulic motor structure, and the oil being pumped. Unless adequate means are provided for removing this heat from the system, the oil soon reaches a destructive temperature and the temperature of the pump and hydraulic motor becomes so high that differential heat expansion soon destroys the initial pump clearance dimensions.

If air is drawn through the air ducts 70 in the pump casing and then discharged through the motor structure, the air entering the motor structure will be at a higher temperature than the ambient external air temperature. On the other hand, if air is taken in at one end of the motor and blown through the motor structure and then into the air ducts in the pump structure, the cooling air available for the pumped oil will have a higher temperature than that of the ambient air.

In accordance with the present invention the fan 24 draws air into chamber 22 through the motor in one direction and through the air ducts 70 in the opposite direction and discharges all such air through the openings 23.

The fan 24 sucks air through the air ducts 14 in the stator field coils of the motor structure and through the air gap between the stator and rotor of the motor and discharges this air through the outlet passages 23. The fan 24 also sucks air through the air ducts 70 in the pump structure and discharges the air through the outlets 23. Thus a common means is provided for cooling both the motor and the oil of the hydraulic system without the disadvantage of discharging heated air from one to the other of the component parts.

The fan 24 materially aids in the cooling of the motor as the discharge pressure of the fan is to the surrounding atmosphere, which is also the suction pressure for the fan 12 adjacent the air inlets in the end plate 18. Thus, the total pressure drop available through the motor structure is the pressure built up by the fan 24 and 12. By this means a considerable volume of air can be passed through even the restricted passages available within the motor structure as the two fans are operating in series. The air coming to fan 24 through the air ducts 70 has little obstruction so that the fan 24 is able to draw a considerable volume of air through these ducts. On the other hand the area of the air ducts 70 is so proportioned to the capacity of the fan 24 that a very material pressure differential is produced by the fan 24 on the air being drawn through the motor structure.

While I have described and illustrated one embodiment which my invention may take it will be apparent to those skilled in the art that other embodiments of the invention, as well as modifications of that disclosed, may be made without departing in any way from the spirit or scope of the invention for the limits of which reference must be had to the appended claim.

What is claimed is:

In combination, an electric motor having a housing, a rotatable armature, a rotatable armature shaft, a commutator at one end of said shaft and drive means at the other end thereof, a casing providing an oil reservoir attached to the motor housing at the drive end of the motor in axially spaced relation to the armature to provide a chamber therebetween, said chamber having a peripheral wall having openings therein through which the interior of the chamber is communicated to atmosphere, a pump housing within said casing surrounding the drive end of the shaft having an opening through which the interior thereof communicates with the interior of the casing, pump means within said pump housing operatively connected to said shaft, a plurality of air ducts extending axially through said casing and at least partially surrounding said pump housing and opening to atmosphere at their outer ends and into said chamber at their inner ends, and a fan mounted on the armature shaft within said chamber for drawing air in one direction through said air ducts and in another direction through said motor and exhausting it through the openings in the peripheral wall of said chamber to simultaneously cool the oil in said casing, the pump housing and the motor.

VAINO A. HOOVER.

REFERENCES CITED

The following references are of record in the file of this patent:

UNITED STATES PATENTS

| Number | Name | Date |
| --- | --- | --- |
| 2,035,096 | Schneider | Mar. 24, 1936 |
| 2,226,986 | Wechsberg et al. | Dec. 31, 1940 |
| 2,236,244 | Cornelius | Mar. 25, 1941 |

FOREIGN PATENTS

| Number | Country | Date |
| --- | --- | --- |
| 147,656 | Austria | Nov. 10, 1936 |
| 573,822 | Germany | Apr. 6, 1933 |